United States Patent
Yun

(10) Patent No.: US 11,752,640 B2
(45) Date of Patent: Sep. 12, 2023

(54) ROBOT JOINT STRUCTURE AND ROBOT HAND COMPRISING SAME

(71) Applicant: DAEGU GYEONGBUK INSTITUTE OF SCIENCE AND TECHNOLOGY, Daegu (KR)

(72) Inventor: Dong Won Yun, Daejeon (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 361 days.

(21) Appl. No.: 17/188,120

(22) Filed: Mar. 1, 2021

(65) Prior Publication Data

US 2021/0268662 A1 Sep. 2, 2021

(30) Foreign Application Priority Data

Mar. 2, 2020 (KR) .................. 10-2020-0026130

(51) Int. Cl.
| | |
|---|---|
| *B66C 1/10* | (2006.01) |
| *B25J 15/02* | (2006.01) |
| *B25J 15/00* | (2006.01) |
| *B25J 9/10* | (2006.01) |
| *B25J 17/00* | (2006.01) |

(52) U.S. Cl.
CPC ........... *B25J 15/0009* (2013.01); *B25J 9/104* (2013.01); *B25J 17/00* (2013.01)

(58) Field of Classification Search
CPC ......... B25J 15/0009; B25J 9/104; B25J 17/00
USPC ............................................... 294/213, 111
See application file for complete search history.

(56) References Cited

U.S. PATENT DOCUMENTS

| | | | | | |
|---|---|---|---|---|---|
| 4,558,911 | A | * | 12/1985 | Ruoff | B25J 15/0009 439/13 |
| 4,921,293 | A | * | 5/1990 | Ruoff | A61F 2/583 623/64 |
| 4,946,380 | A | * | 8/1990 | Lee | A61F 2/583 623/64 |
| 5,062,673 | A | * | 11/1991 | Mimura | B25J 15/0009 294/111 |
| 5,570,920 | A | * | 11/1996 | Crisman | B25J 9/104 294/111 |
| 6,896,704 | B1 | * | 5/2005 | Higuchi | A61F 2/70 623/64 |
| 7,328,481 | B2 | * | 2/2008 | Barnett | H04M 1/022 16/227 |
| 9,964,989 | B2 | * | 5/2018 | Krivoy | G06F 1/1618 |
| 10,683,085 | B2 | * | 6/2020 | Foster | F16C 11/12 |

(Continued)

FOREIGN PATENT DOCUMENTS

| | | |
|---|---|---|
| JP | 10-202573 A | 8/1998 |
| JP | 2003-117873 A | 4/2003 |

(Continued)

*Primary Examiner* — Paul T Chin
(74) *Attorney, Agent, or Firm* — Hauptman Ham, LLP

(57) ABSTRACT

The robot joint structure includes a first body, a second body disposed to be spaced apart from the first body, a first joint configured to connect the first body and the second body, and a second joint disposed to face the first joint and configured to connect the first body and the second body. The first joint includes a first connector and a second connector that cross each other and the second joint includes a third connector and a fourth connector that cross each other.

18 Claims, 12 Drawing Sheets

(56) References Cited

U.S. PATENT DOCUMENTS 11,285,617 B2 *   3/2022   Williams .................. B25J 9/104
2013/0152724 A1   6/2013   Mozeika et al.

FOREIGN PATENT DOCUMENTS

| KR | 10-0637956 B1 | 10/2006 |
| KR | 10-2011-0001125 A | 1/2011 |
| KR | 10-1846083 B1 | 5/2018 |
| KR | 10-2020-0020938 A | 2/2020 |
| WO | 2008/026574 A1 | 3/2008 |

* cited by examiner (a)

(b)

ROBOT JOINT STRUCTURE AND ROBOT HAND COMPRISING SAME

CROSS-REFERENCE TO RELATED APPLICATION

This application claims benefit of priority to Korean Patent Application No. 10-2020-0026130, entitled "Robot joint structure and a robot hand comprising the same" and filed on Mar. 2, 2020, in the Korean Intellectual Property Office, the entire disclosure of which is incorporated herein by reference.

BACKGROUND

1. Technical Field

The present disclosure relates to a robot joint structure and a robot hand including the same, and more particularly, to a robot joint structure with reinforced rotational stiffness and a robot hand including the same.

2. Background

Recently, research on humanoid robots has been actively conducted. In order for such humanoid robots to perform tasks performed by human hands, a robot hand capable of implementing a natural motion function is required. Accordingly, continuous research is being conducted on humanoid robot hands having a plurality of finger joint structures that mimic human hands.

SUMMARY

The present disclosure is directed to providing a robot joint structure that has reinforced rotational stiffness and enables a compact design, and a robot hand including the same.

A robot joint structure according to some embodiments of the present disclosure may include a first body, a second body disposed to be spaced apart from the first body, a first joint configured to connect the first body and the second body, and a second joint disposed to face the first joint and configured to connect the first body and the second body, wherein the first joint may include a first connector and a second connector that cross each other and the second joint may include a third connector and a fourth connector that cross each other.

According to some embodiments of the present disclosure, the first joint and the second joint may be arranged in mirror image symmetry to each other.

According to some embodiments of the present disclosure, the first body may include a pair of first frames arranged to be spaced apart from each other, and the second body may include a pair of second frames arranged to be spaced apart from each other.

According to some embodiments of the present disclosure, the first joint may connect one of the pair of first frames and one of the pair of second frames, which face each other, and the second joint may connect the other one of the pair of first frames and the other one of the pair of second frames, which face each other.

According to some embodiments of the present disclosure, the first frame may include a first protrusion protruding between the first connector and the second connector or protruding between the third connector and the fourth connector, wherein each of the first to fourth connectors is connected to the first frame, and the second frame may include a second protrusion protruding between the first connector and the second connector or protruding between the third connector and the fourth connector, wherein each of the first to fourth connectors is connected to the second frame.

According to some embodiments of the present disclosure, each of the first to fourth connectors may include a curved portion between one end thereof connected to the first body and the other end thereof connected to the second body.

According to some embodiments of the present disclosure, the robot joint structure may further include a driver configured to drive at least one of the first body or the second body.

According to some embodiments of the present disclosure, the driver may include a driving force generating part configured to generate a driving force, and a driving force transferring part configured to transfer, to the first body and the second body, the driving force generated by the driving force generating part.

According to some embodiments of the present disclosure, the first body may include at least one first pulley, the second body may include at least one second pulley, the driving force generating part may include a motor, the driving force transferring part may include a motor pulley connected to the motor, and a wire connected to the motor pulley, the first pulley, and the second pulley, and configured to transfer the driving force to the first body and the second body.

According to some embodiments of the present disclosure, the wire may extend from the motor pulley through the space between the pair of first frames, and through the space between the pair of second frames.

A robot hand according to some embodiments of the present disclosure may include a base part, a plurality of first robot fingers rotatably connected to the base part, a second robot finger disposed in a direction crossing a longitudinal direction of the plurality of first robot fingers and rotatably connected to the base part, a first driver disposed in the base part and configured to drive the plurality of first robot fingers, and a second driver disposed in the base part and configured to drive the second robot finger, wherein each of the plurality of first robot fingers and the second robot finger may include a first body, a second body disposed to be spaced apart from the first body, a first joint configured to connect the first body and the second body, and a second joint disposed to face the first joint and configured to connect the first body and the second body, the first joint may include a first connector and a second connector that cross each other, and the second joint may include a third connector and a fourth connector that cross each other.

According to some embodiments of the present disclosure, the first joint and the second joint may be arranged in mirror image symmetry to each other.

According to some embodiments of the present disclosure, the first body may include a pair of first frames arranged to be spaced apart from each other, and the second body may include a pair of second frames arranged to be spaced apart from each other.

According to some embodiments of the present disclosure, the first joint may connect one of the pair of first frames and one of the pair of second frames, which face each other, and the second joint may connect the other one of the pair of first frames and the other one of the pair of second frames, which face each other.

According to some embodiments of the present disclosure, the first frame may include a first protrusion protruding between the first connector and the second connector or protruding between the third connector and the fourth connector, wherein each of the first to fourth connectors is connected to the first frame, and the second frame may include a second protrusion protruding between the first connector and the second connector or protruding between the third connector and the fourth connector, wherein each of the first to fourth connectors is connected to the second frame.

According to some embodiments of the present disclosure, each of the first to fourth connectors may include a curved portion between one end thereof connected to the first body and the other end thereof connected to the second body.

According to some embodiments of the present disclosure, the first body may include at least one first pulley, the second body may include at least one second pulley, the first driver may include a first motor configured to generate a driving force, a first motor pulley connected to the motor, and a first wire connected to the first motor pulley, the first pulley, and the second pulley, and configured to transfer the driving force to the plurality of first robot fingers.

According to some embodiments of the present disclosure, the first wire may extend from the first motor pulley through the space between the pair of first frames of the first robot finger, and through the space between the pair of second frames of the first robot finger.

According to some embodiments of the present disclosure, the first body may include at least one first pulley, the second body may include at least one second pulley, the second driver may include a second motor configured to generate a driving force, a second motor pulley connected to the second motor, and a second wire connected to the second motor pulley, the first pulley, and the second pulley, and configured to transfer the driving force to the second robot finger.

According to some embodiments of the present disclosure, the second wire may extend from the second motor pulley through the space between the pair of first frames of the second robot finger, and through the space between the pair of second frames of the second robot finger.

In the robot joint structure and the robot hand including the same, according to the embodiments of the present disclosure, since two adjacent bodies are connected by the two joints that are arranged in mirror image symmetry to each other, the rotational stiffness and the durability of the robot joint structure may be improved. In addition, in the robot joint structure and the robot hand including the same, according to the embodiments of the present disclosure, since a drive mechanism is disposed between the pair of frames of the body, space arrangement is efficient, thereby enabling a compact design of the robot hand.

DETAILED DESCRIPTION

The present disclosure may be variously modified and may have various embodiments, and specific embodiments of the present disclosure are illustrated with reference to the drawings and will be described in detail in the detailed description. However, this is not intended to limit the present disclosure to the specific embodiments, and should be understood to include all modifications, equivalents, and substitutes that fall within the spirit and scope of the present disclosure. In describing the present disclosure, when a detailed description of a related known technology is considered to obscure the subject matter of the present disclosure, a detailed description thereof will be omitted.

Terms such as "first" or "second" may be used to describe various components, but the components should not be limited to these terms. These terms are only used for the purpose of distinguishing one component from another component.

The terms used in the present disclosure are only used to describe the specific embodiments, and are not intended to limit the present disclosure. Singular expressions include plural expressions unless the context clearly indicates otherwise. In addition, in each of the drawings, components are exaggerated, omitted, or schematically illustrated for convenience and clarity of description, and the size of each component does not entirely reflect the actual size.

In the description of each component, when one component is described as being formed "on" or "under" another component, "one component is formed on or under another component" includes both "two components are directly contacted with each other" and "two components are formed indirectly through other components", and the criteria for "on" and "under" will be described based on the drawings.

Hereinafter, embodiments of the present disclosure will be described in detail with reference to the accompanying drawings, and when described with reference to the accompanying drawings, the same or corresponding components are assigned the same reference numbers, and an overlapping description thereof will be omitted.

Figure 1:
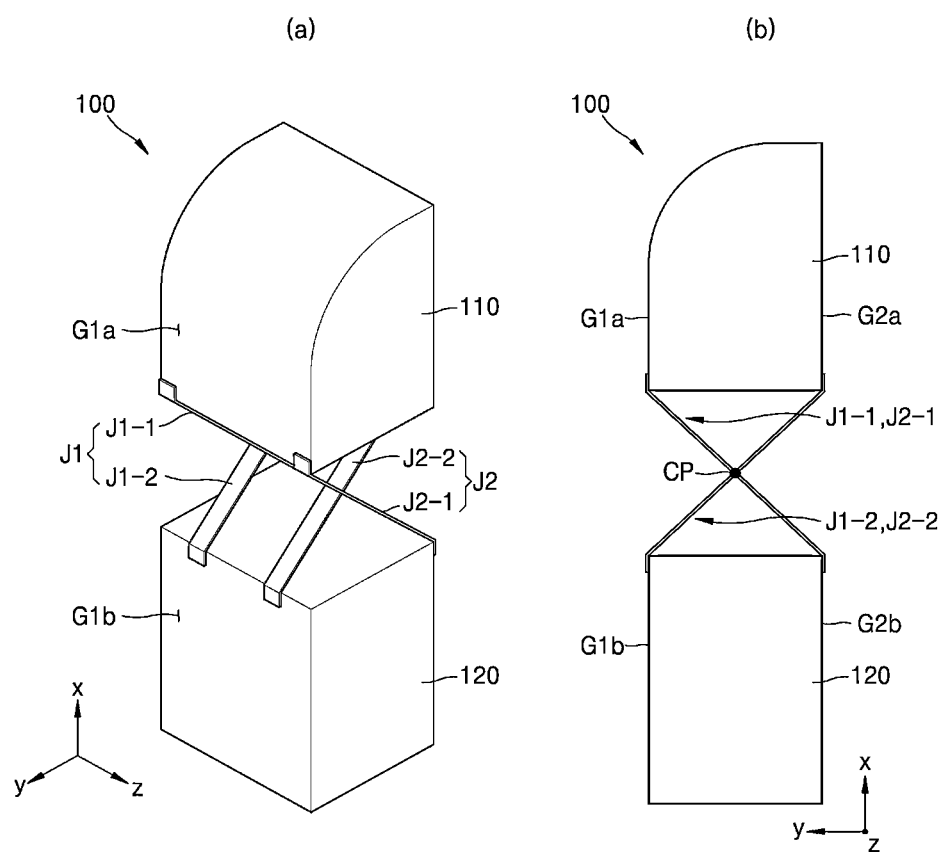
FIG. 1 illustrates a robot joint structure according to some embodiments of the present disclosure.
Figure 2:
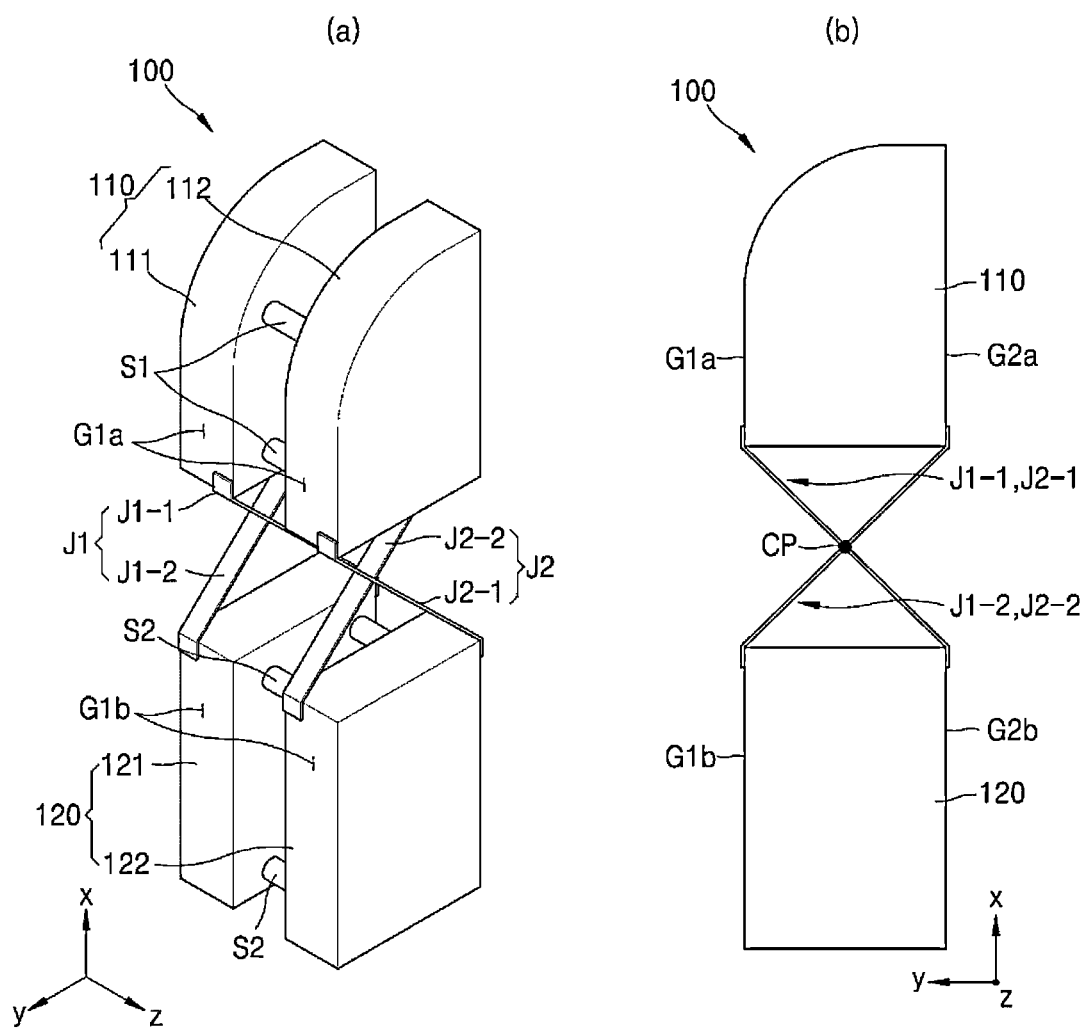
FIG. 2 schematically illustrates a robot joint structure according to some embodiments of the present disclosure.
Figure 3:
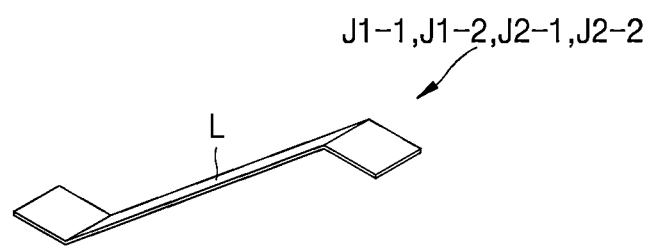
FIG. 3 is a perspective view illustrating a connector according to some embodiments of the present disclosure.
Figure 3:
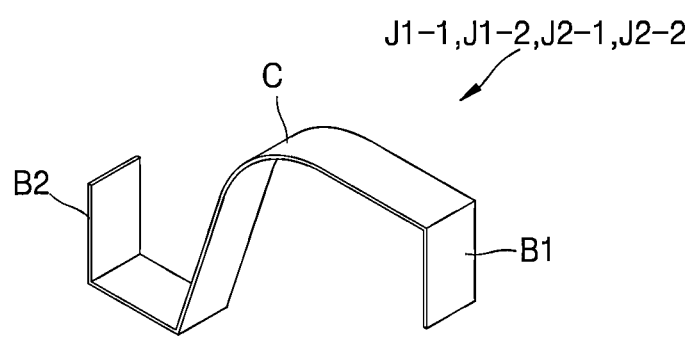

FIG. 1 illustrates a robot joint structure according to some embodiments of the present disclosure. FIG. 2 schematically illustrates a robot joint structure according to some embodiments of the present disclosure. FIG. 3 is a perspective view illustrating a connector according to some embodiments of the present disclosure.

Referring to FIGS. 1 to 3, a robot joint structure 100 according to some embodiments of the present disclosure may include a first body 110, a second body 120, a first joint J1, and a second joint J2.

The first body 110 and the second body 120 may be knuckles of the robot joint structure 100 that grips a target object. The first body 110 and the second body 120 may have various shapes such as a cylinder or a polygonal column shape, but hereinafter, for convenience of description, an embodiment in which the first body 110 and the second body 120 have a square column shape will be described.

The first body 110 may include a gripping surface G1a and a non-gripping surface G2a. When the robot joint structure 100 grips the target object, the gripping surface G1a may be a surface of the first body 110 that comes into contact with the target object. The non-gripping surface G2a may be a surface of the first body 100 that is opposite to the gripping surface G1a. In some embodiments, the gripping surface G1a may at least partially have a curved portion. Since the gripping surface G1a has the curved portion, it is possible to prevent a rotation motion of the first body 110 from being disturbed by ends of the second body 120 disposed adjacent to the first body 110.

The second body 120 may be disposed to be spaced apart from the first body 110. In addition, the second body 120 may be disposed to face the first body 110. The second body 120 may include a gripping surface G1b and a non-gripping surface G2b. Specific features of the gripping surface G1b and the non-gripping surface G2b of the second body 120 may be the same as or similar to those described with respect to the gripping surface G1b and the non-gripping surface G2b of the first body 110. In some embodiments, the gripping surface G1b of the second body 120 may not have a curved portion.

In some embodiments, at least one of the gripping surface G1a of the first body 110 or the gripping surface G1b of the second body 120 may have protrusions or uneven patterns. In some embodiments, the robot joint structure 100 may be covered with a cover made of a material such as rubber or silicon. Accordingly, it is possible to prevent the target object gripped by the robot joint structure 100 from being detached from the robot joint structure 100.

The first joint J1 and the second joint J2 may be disposed between the first body 110 and the second body 120 so as to connect the first body 100 and the second body 120. In such a case, the first joint J1 and the second joint J2 may be disposed to face each other. In addition, the first joint J1 and the second joint J2 may be disposed to be spaced apart from each other.

The first joint J1 may include a first connector J1-1 and a second connector J1-2. In some embodiments, the first connector J1-1 and the second connector J1-2 may be disposed to cross each other. In such a case, the first connector J1-1 and the second connector J1-2 may be disposed to be spaced apart from each other by a predetermined distance in a width direction (Z direction in FIG. 1(a)) of the first body 110 or in a width direction (Z direction in FIG. 1(a)) of the second body 120. Accordingly, it is possible to prevent occurrence of friction and interference between the first connector J1-1 and the second connector J1-2 when the robot joint structure 100 rotates. In one example, the predetermined distance may be shorter than a distance between the first joint J1 and the second joint J2. In another example, the predetermined distance may be shorter than a width of the first connector J1-1 and of the second connector J1-2.

One end of the first connector J1-1 and one end of the second connector J1-2 may be connected to the first body 110, and the other end of the first connector J1-1 and the other end of the second connector J1-2 may be connected to the second body 120. In such a case, in some embodiments, the first connector J1-1 may extend from the gripping surface G1a of the first body 110 to the non-gripping surface G2b of the second body 120. In addition, the second connector J1-2 may extend from the non-gripping surface G2a of the first body 110 to the gripping surface G1b of the second body 120.

The second joint J2 may include a third connector J2-1 and a fourth connector J2-2. In such a case, specific features of the third connector J2-1 and the fourth connector J2-2 may be the same as or similar to those described with respect to the first connector J1-1 and the second connector J1-2 as described above.

The first joint J1 and the second joint J2 may be arranged in mirror image symmetry to each other. In such a case, as illustrated in FIGS. 1 (b) and 2 (b), when the robot joint structure 100 is viewed from its side, the first joint J1 and the second joint J2 may have the same cross point CP. In some embodiments, the first connector J1-1 may be disposed parallel to the third connector J2-1, and the second connector J1-2 may be disposed parallel to the fourth connector J2-2. In such a case, when the robot joint structure 100 is viewed from its side, a first cross point of the first connector J1-1 and the second connector J1-2 may coincide with a second cross point of the third connector J2-1 and the fourth connector J2-2. Accordingly, the first joint J1 rotates about the first cross point, and the second joint J2 rotates about the second cross point. In such a case, since the first cross point and the second cross point are arranged on the same line in the width direction (Z direction in FIGS. 1 and 2) of the robot joint structure 100, the robot joint structure 100 may rotate without being inclined with respect to a height direction (Y direction in FIGS. 1 and 2) of the robot joint structure 100. Accordingly, since an area in which the gripping surface G1a of the first body 110 or the gripping surface G1b of the second body 120 contacts the target object is maximized, gripping strength and stability of the robot joint structure 100 may be improved.

The joints J1 and J2 and the connectors J1-1, J1-2, J2-1, and J2-2 may be made of an elastic material. As an example, the joints J1 and J2 and the connectors J1-1, J1-2, J2-1, and J2-2 may be manufactured by heat-treating a carbon structural steel SKS. The connectors J1-1, J1-2, J2-1, and J2-2 may be, for example, flexure hinges. In such a case, the joints J1 and J2 may be cross flexure hinges in which two flexure hinges are disposed to cross each other.

As illustrated in FIGS. 3(a) and 3(b), the connectors may have various shapes. In some embodiments, the connectors may be a straight-type structure (L). In such a case, at least one end of each connector may include a bent part that is connected to the first body 110 or the second body 120.

In some embodiments, the connectors may include a curved portion C between one end thereof connected to the first body 110 and the other end thereof connected to the second body 120. At least one end of each connector may include a bent part that is connected to the first body 110 or the second body 120. In such a case, each connector may include a first bent part B1 that is bent downward from the connector on one side of the connector, and a second bent part B2 that is bent upward from the connector on the other side of the connector. In such a case, the curved portion C may be disposed between the first bent part B1 and the second bent part B2. However, the present disclosure is not limited thereto, and the connectors may have various shapes capable of connecting the first body 110 and the second body 120.

At least one first shaft S1 may be disposed between the pair of first frames 111 and 112. The first shaft S1 may be inserted into a first coupling hole h1 formed on an inner surface of the pair of first frames 111 and 112 so as to couple the pair of first frames 111 and 112.

As illustrated in FIG. 2, the first body 110 may include the pair of first frames 111 and 112, which face each other, and the second body 120 may include the pair of second frames 121 and 122, which face each other.

The pair of first frames 111 and 112 may be disposed to be spaced apart from each other by a predetermined distance. The pair of first frames 111 and 112 may be symmetrical to each other.

In such a case, one end of the first connector J1-1 and one end of the second connector J1-2 may be connected to one frame 111 of the pair of first frames 111 and 112, and the other end of the first connector J1-1 and the other end of the second connector J1-2 may be connected to one frame 121 of the pair of second frames 121 and 122. In addition, the first connector J1-1 may extend from the gripping surface G1a of one frame 111 of the pair of first frames 111 and 112 to the non-gripping surface G2b of one frame 121 of the pair of second frames 121 and 122, and the second connector J1-2 may extend from the non-gripping surface G2a of one frame 111 of the pair of first frames 111 and 112 to the gripping surface G1b of one frame 121 of the pair of second frames 121 and 122.

In addition, one end of the third connector J2-1 and one end of the fourth connector J2-2 may be connected to the other frame 112 of the pair of first frames 111 and 112, and the other end of the third connector J2-1 and the other end of the fourth connector J2-2 may be connected to the other frame 122 of the pair of second frames 121 and 122. In such a case, the third connector J2-1 may extend from the gripping surface G1a of the other frame 112 of the pair of first frames 111 and 112 to the non-gripping surface G2b of the other frame 122 of the pair of second frames 121 and 122, and the fourth connector J2-2 may extend from the non-gripping surface G2a of the other frame 112 of the pair of first frames 111 and 112 to the gripping surface G1b of the other frame 122 of the pair of second frames 121 and 122.

In some embodiments, the first shafts S1 may be provided in plural number. Some of the plurality of first shafts S1 may be disposed to be adjacent to the gripping surface G1a of the first body 110 between the pair of first frames 111 and 112, and the remaining some of the plurality of first shafts S1 may be disposed to be adjacent to the non-gripping surface G2a of the first body 110 between the pair of first frames 111 and 112. In such a case, the first pulley P1 connected to a driver 200 may be coupled to the first shaft S1.

The pair of second frames 121 and 122 may be disposed to be spaced apart from each other. The pair of second frames 121 and 122 may be symmetrical to each other. In such a case, the distance that the pair of second frames 121 and 122 are spaced apart from each other may be the same as the distance that the pair of first frames 111 and 112 are spaced apart from each other. At least one second shaft S2 may be disposed between the pair of second frames 121 and 122. The second shaft S2 may be inserted into a second coupling hole h2a, h2b formed on an inner surface of the pair of second frames 121 and 122 so as to couple the pair of second frames 121 and 122.

In some embodiments, the second shaft S2 may be provided in plural number. Some of the plurality of second shafts S2 may be disposed to be adjacent to the gripping surface G1b of the second body 120 between the pair of second frames 121 and 122, and the remaining some of the plurality of second shafts S2 may be disposed to be adjacent to the non-gripping surface G2b of the second body 120 between the pair of second frames 121 and 122. In such a case, a second pulley P2a or a second pulley P2b to which a driving force transferring part 220 is connected may be coupled to the second shaft S2.

As described above, since the pair of first frames 111 and 112 of the first body 110 are spaced apart from each other, a space may be formed therebetween. In addition, since the pair of second frames 121 and 122 of the second body 120 are spaced apart from each other, a space may be formed therebetween. A drive mechanism of the robot joint structure 100 may be disposed in these spaces. A detailed description thereof will be described below.

Figure 4:
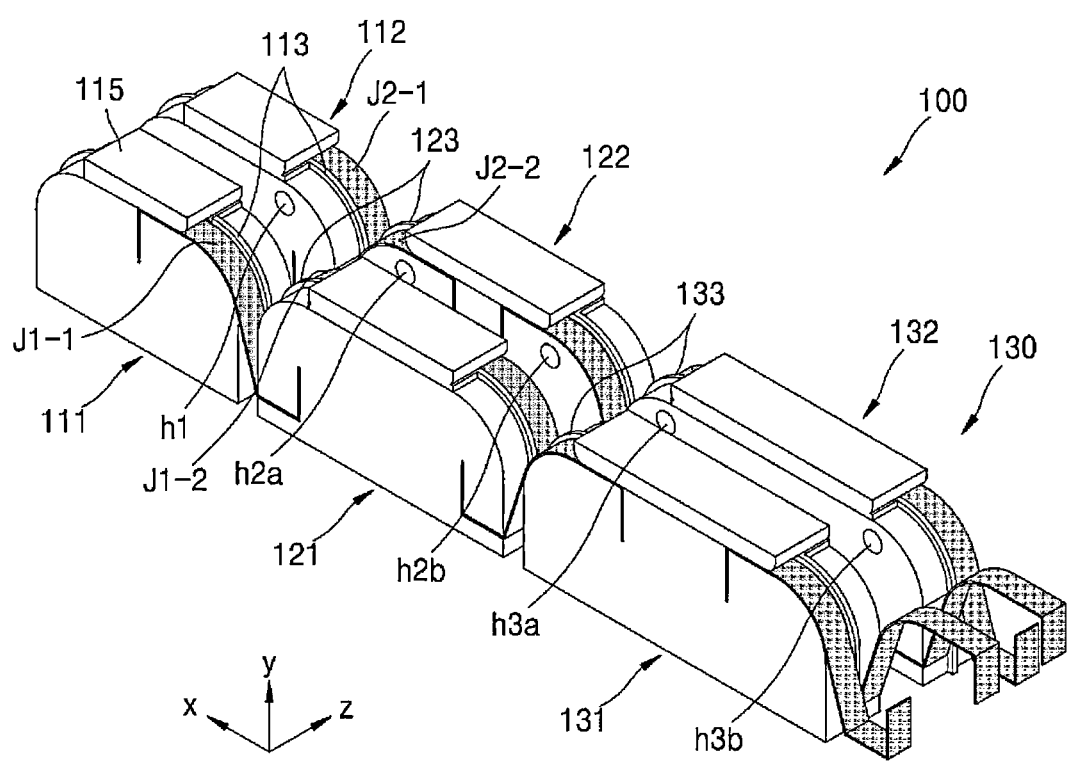
FIG. 4 is a perspective view illustrating a robot joint structure according to some embodiments of the present disclosure.
Figure 5:
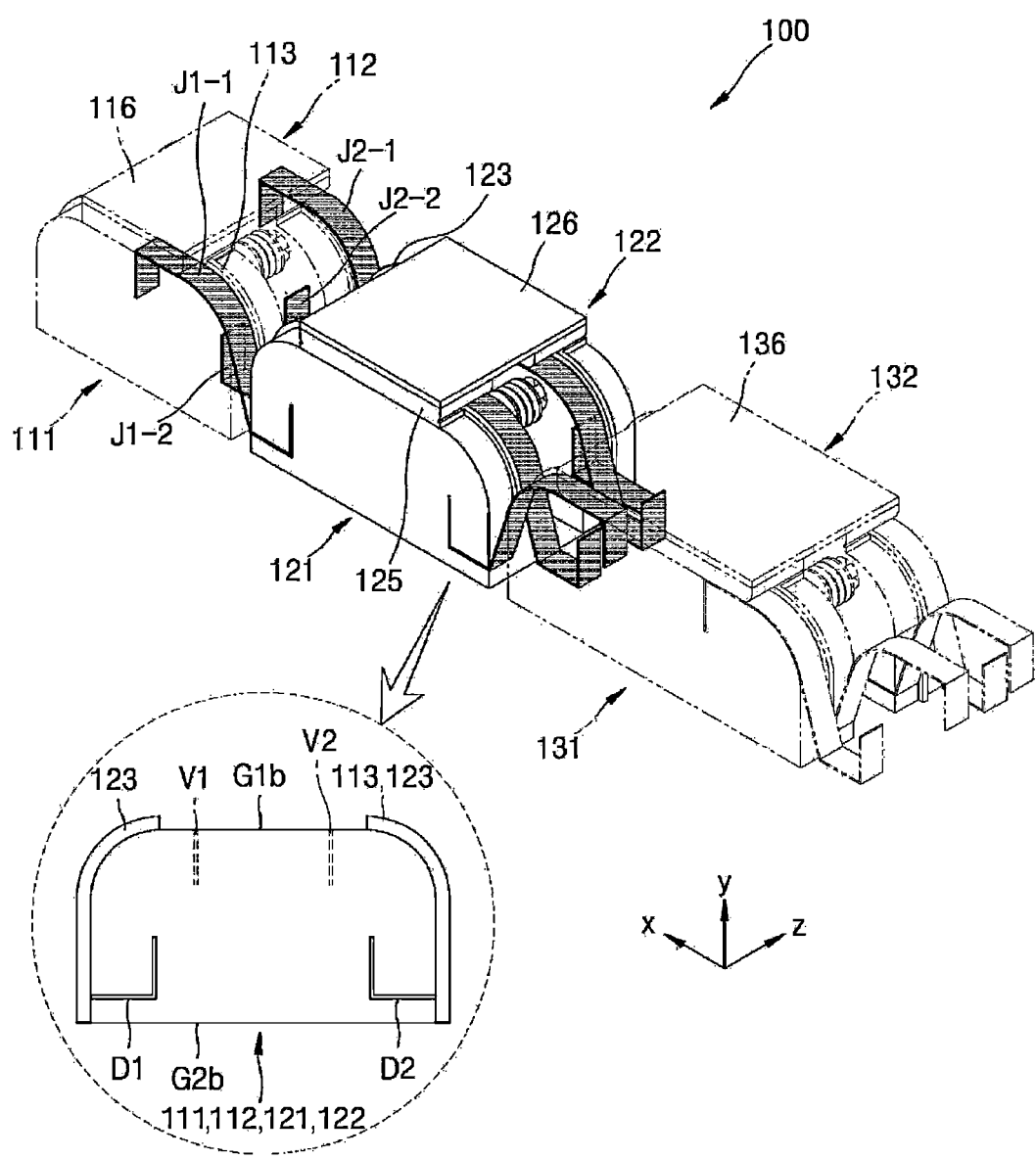
FIG. 5 is a perspective view illustrating a robot joint structure according to some embodiments of the present disclosure.

FIG. 4 is a perspective view illustrating a robot joint structure according to some embodiments of the present disclosure. FIG. 5 is a perspective view illustrating a robot joint structure according to some embodiments of the present disclosure.

Referring to FIGS. 4 and 5, the robot joint structure 100 may further include a third body 130. However, the present disclosure is not limited thereto, and the robot joint structure 100 may include four or more bodies.

As described above, the first body 110 may include the pair of first frames 111 and 121. In such a case, the first frame 111, which is one of the pair of first frames 111 and 112, may include a curved portion at one end of the first frame 111. In some embodiments, curved portions may be formed at both ends of the first frame 111.

The first connector J1-1 and the second connector J1-2 may be disposed at an end portion of the first frame 111. The first connector J1-1 and the second connector J1-2 may be disposed to be spaced apart from each other in a direction (Z direction in FIG. 4) perpendicular to the longitudinal direction of the robot joint structure 100. In such a case, the curved portion C of the first connector J1-1 may be disposed to contact the curved portion of the first frame 111. In addition, the curved portion C of the first connector J1-1 and the curved portion of the first frame 111 may have the same radius of curvature. Accordingly, the first connector J1-1 may be disposed to be in close contact with the first frame 111. Further, when the robot joint structure 100 is bent, the first frame 111 may rotate smoothly, thereby improving the motion stability of the robot joint structure 100.

The first frame 111 may include a first support 115 protruding from the gripping surface G1a of the first frame 111 toward the outside of the gripping surface G1a. The first support 115 may be disposed between the curved portions of the first frame 111.

The first frame 111 may include a first protrusion 113 protruding from the curved portion of the first frame 111 and extending along the curved portion of the first frame 111. The first protrusion 113 may protrude between the first connector J1-1 and the second connector J1-2 that are disposed along the curved portion of the first frame 111. In such a case, the first protrusion 113 may support the first connector J1-1 and the second connector J1-2 that are connected to the first frame 111. Accordingly, while the robot joint structure 100 lifts a heavy object or lowers it toward the ground, by preventing the first connector J1-1 and the second connector J1-2 from bending in a direction facing the ground or in a direction rising from the ground, it is possible to prevent the support stiffness of the robot joint structure 100 from being reduced.

The first frame 111 may include an insertion hole into which the bent part of the connector is inserted. In some embodiments, the insertion hole may include upper insertion holes V1 and V2 and lower insertion holes D1 and D2. The upper insertion holes V1 and V2 may be disposed on the first frame 111 to be adjacent to the gripping surface G1a of the first frame 112, and the lower insertion holes D1 and D2 may be disposed on the first frame 111 to be adjacent to the non-gripping surface G2a of the first frame 112.

The first frame 112, which is the other one of the pair of first frames 111 and 112, may include a curved portion at one end of the first frame 112. In some embodiments, the first frame 112 may include a curved portion at both ends of the first frame 112.

The third connector J2-1 and the fourth connector J2-2 may be disposed on the curved portion of the first frame 112. In such a case, the third connector J2-1 and the fourth connector J2-2 may be disposed to be spaced apart from each other in a direction (Z direction in FIG. 4) perpendicular to the longitudinal direction of the robot joint structure 100.

The first frame 112 may include a first support 115 protruding from the gripping surface G1a of the first frame 112 toward the outside of the gripping surface G1a. The first support 115 may be disposed between the curved portions of the first frame 112.

The first frame 112 may include a first protrusion 113 protruding from the curved portion of the first frame 112 and extending along the curved portion of the first frame 112. The first protrusion 113 may protrude between the third connector J2-1 and the fourth connector J2-2 that are disposed along the curved portion of the first frame 111. In such a case, the first protrusion 113 may support the third connector J2-1 and the fourth connector J2-2 that are connected to the first frame 112. In such a case, in a manner similar to that described above, while the robot joint structure 100 lifts a heavy object or lowers it toward the ground, by preventing the third connector J2-1 and the fourth connector J2-2 from bending in a direction facing the ground or in a direction rising from the ground, it is possible to prevent the support stiffness of the robot joint structure 100 from being reduced.

The first frame 112 may include an insertion hole into which the bent part of the connector is inserted. In some embodiments, the insertion hole may include upper insertion holes V1 and V2 and lower insertion holes D1 and D2. The upper insertion holes V1 and V2 may be disposed on the first frame 112 to be adjacent to the gripping surface G1a of the first frame 112, and the lower insertion holes D1 and D2 may be disposed on the first frame 112 to be adjacent to the non-gripping surface G2a of the first frame 112.

As described above, the second body 120 may include a pair of second frames 121 and 122. In such a case, each of the pair of second frames 121 and 122 may include a curved portion, an insertion hole, a second protrusion 123, and a second support 125. Accordingly, since specific features of the second body 120 including the pair of second frames 121 and 122 are the same as or similar to those described with respect to the first body 110 as described above, a detailed description thereof will be omitted.

One end of the first connector J1-1 may be connected to the first frame 111, and the other end of the first connector J1-1 may be connected to the second frame 121. In such a case, since the first bent part B1 of the first connector J1-1 is inserted into the upper insertion hole V2 of the first frame 111 and the second bent part B2 of the first connector J1-1 is inserted into the lower insertion hole D1 of the second frame 121, the first connector J1-1 may be fixed to the first frame 111 and the second frame 121.

One end of the second connector J1-2 may be connected to the first frame 111, and the other end of the second connector J1-2 may be connected to the second frame 121. In such a case, since the first bent part B1 of the second connector J1-2 is inserted into the upper insertion hole V1 of the second frame 121 and the second bent part B2 of the second connector J1-2 is inserted into the lower insertion hole D2 of the first frame 111, the second connector J1-2 may be fixed to the first frame 111 and the second frame 121.

Similarly, one end of the third connector J2-1 may be connected to the first frame 112, and the other end of the third connector J2-1 may be connected to the second frame 122. In such a case, since the first bent part B1 of the third connector J2-1 is inserted into the upper insertion hole V1 of the first frame 112 and the second bent part B2 of the third connector J2-1 is inserted into the lower insertion hole D1 of the second frame 122, the third connector J2-1 may be fixed to the first frame 112 and the second frame 122.

One end of the fourth connector J2-2 may be connected to the first frame 112, and the other end of the fourth connector J2-2 may be connected to the second frame 122. In such a case, since the first bent part B1 of the fourth connector J2-2 is inserted into the upper insertion hole V1 of the second frame 122 and the second bent part B2 of the fourth connector J2-2 is inserted the lower insertion hole D2 of the first frame 112, the fourth connector J2-2 may be fixed to the first frame 112 and the second frame 122.

As the connectors are fixed to the frame in the manner described above, when the robot joint structure 100 rotates to grip the target object, the first connector J1-1 to the fourth connector J2-2 may be prevented from being separated from the first frame 111 and the second frame 122, thereby improving the working stability of the robot joint structure 100.

The third body 130 may include a pair of third frames 131 and 132. Each of the pair of third frames 131 and 132 may include a curved portion, an insertion hole, a third protrusion 133, and a third support 135. In such a case, since specific features of the third body 130 and the connection relationship between the third body 130 and the second body 120 are the same as or similar to those described with respect to the first body 110 and the second body 120 as described above, a detailed description thereof will be omitted.

Figure 6:
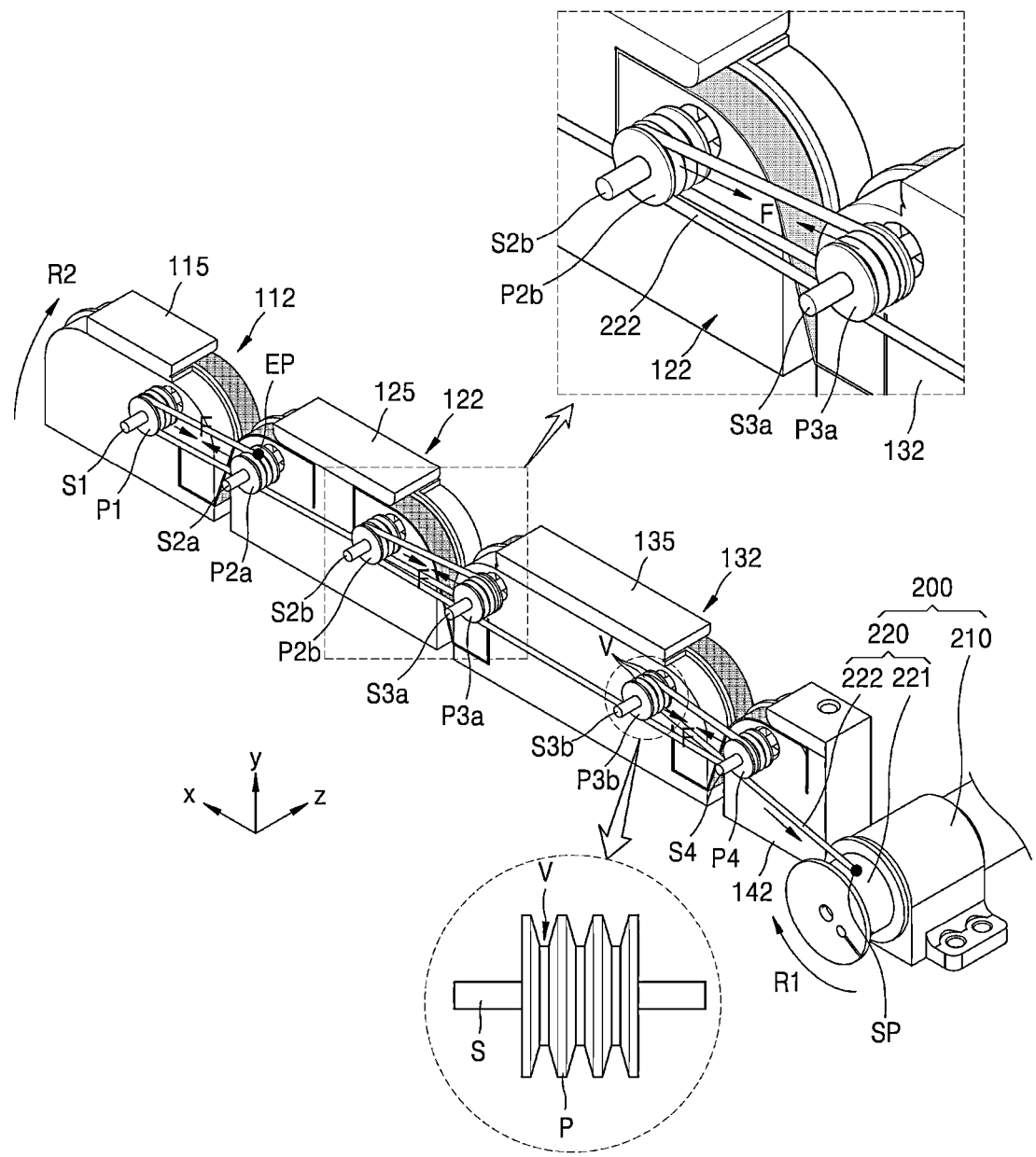
FIG. 6 is a perspective view illustrating the robot joint structure and a driver for driving a robot.

FIG. 6 is a perspective view illustrating the robot joint structure and a driver for driving a robot.

Referring to FIG. 6, the robot joint structure 100 may further include a connection body 140 and a driver 200.

The connection body 140 may be disposed between the robot joint structure 100 and the driver 200. Specifically, the connection body 140 is disposed between the third body 130 and the driver 200 and is connected to the third body 130. As a result, the connection body 140 may connect the robot joint structure 100 and the driver 200. The connection body 140 may include a pair of fourth frames 141 and 142 that face each other, a fourth shaft S4 connecting the pair of fourth frames 141 and 142, and a fourth pulley P4 coupled to the fourth shaft S4. In such a case, specific features and connection relationships of the connection body 140 may be the same as or similar to those described with respect to the first body 110 and the second body 120 as described above.

The driver 200 may be disposed outside the robot joint structure 100. However, the present disclosure is not limited thereto, and the driver 200 may be disposed inside the robot joint structure 100.

The driver 200 may drive the robot joint structure 100. Specifically, the driver 200 may drive the robot joint structure 100 such that at least one of the first body 110 to the third body 130 rotates. In such a case, the driver 200 may include a driving force generating part 210 and a driving force transferring part 220.

The driving force generating part 210 may generate a driving force that rotates the first body 110 to the third body 130. As an example, the driving force generating part 210 may be a motor (a first motor) 210.

Since the driving force transferring part 220 connects the driving force generating part 210 and the robot joint structure 100, the driving force transferring part 220 may transfer the driving force generated by the driving force generating part 210 to the robot joint structure 100. In addition, the driving force transferring part 220 may include a motor pulley (a first motor pulley) 221 and a wire (a first wire) 222.

The motor pulley 221 may be connected to the motor 210. The motor pulley 221 may rotate about a rotation axis of the motor 210 by a driving force generated by the motor 210. In such a case, as the motor pulley 211 rotates, the wire 222 may be wound around the motor pulley 221 or may be unwound from the motor pulley 221.

The wire 222 may transfer the driving force generated by the motor 210 to the robot joint structure 100. One end of the wire 222 may be connected to the motor pulley 221, and the other end of the wire 222 may be connected to at least one of the pulleys of the robot joint structure 100.

In some embodiments, the motor 210 and the pulleys may be connected by a single wire 222 extending from the motor pulley 221. In such a case, the wire 222 may extend from the motor pulley 221 through the spaces between the pairs of first to fourth frames (111 and 112; 121 and 122; 131 and 132; 141 and 142). The wire 222 may be fixedly connected to the motor pulley 221 and may extend toward the first pulley P1 from a first point SP on the motor pulley 221. In such a case, the wire 222 may be wound around at least one of the second pulley P2b to the fourth pulley P4 that are disposed between the first pulley P1 and the motor pulley 221, or may be wound simultaneously around the two pulleys. The wire 222 extends to the first pulley P1 and then extends toward the second pulley P2a again. Then, after extending to the second pulley P2a, the wire 222 may be fixed to a second point EP on the second pulley P2a.

At least one V-shaped groove V may be formed on a circumferential surface of the first to fourth pulleys P1 to P4. In such a case, since, when the wire 222 is wound around the pulley, the wire 222 is inserted into and supported by the V-shaped groove V, it is possible to prevent the wire 222 from being separated from the pulley.

When the robot joint structure 100 grips the target object, the motor 210 rotates in a direction (for example, in a direction R1 in FIG. 6) in which the wire 222 is wound around the motor pulley 221. By such rotation of the motor 210, the wire 222 may be wound around the motor pulley 221 to become tightened. Accordingly, a force may be applied to the wire 222 in a direction toward the motor pulley 221. Then, since a tension force is applied to the wire 222 by the force applied to the wire 222, a distance between a third shaft S3b and the fourth shaft S4, a distance between a second shaft S2b and the third shaft S3b, and the distance between the first shaft S1 and the second shaft S2a are sequentially decreased. As a result, the robot joint structure 100 may rotate in a direction R2. In such a case, the cross point CP of the joints may move along the curved portion in a direction (in a direction R2 in FIG. 6) in which the robot joint structure 100 rotates.

When at least one of the first body 110 to the third body 130 comes into contact with the target object, or all joints rotate to a maximum allowable rotation range of each of the joints, operation of the motor 210 may be stopped, thereby stopping the gripping operation of the robot joint structure 100.

Since, when the robot joint structure 100 releases the gripping state, the motor 210 rotates in a direction (for example, in a direction R2 in FIG. 6) in which the wire 222 is unwound from the motor pulley 221, the wire 222 wound around the motor pulley 221 may be unwound. Accordingly, since, when a force applied to the wire 222 and the joint is removed, the robot joint structure 100 is unfolded by an elastic restoring force of the joints, the robot joint structure 100 may let go of the target object.

Figure 7:
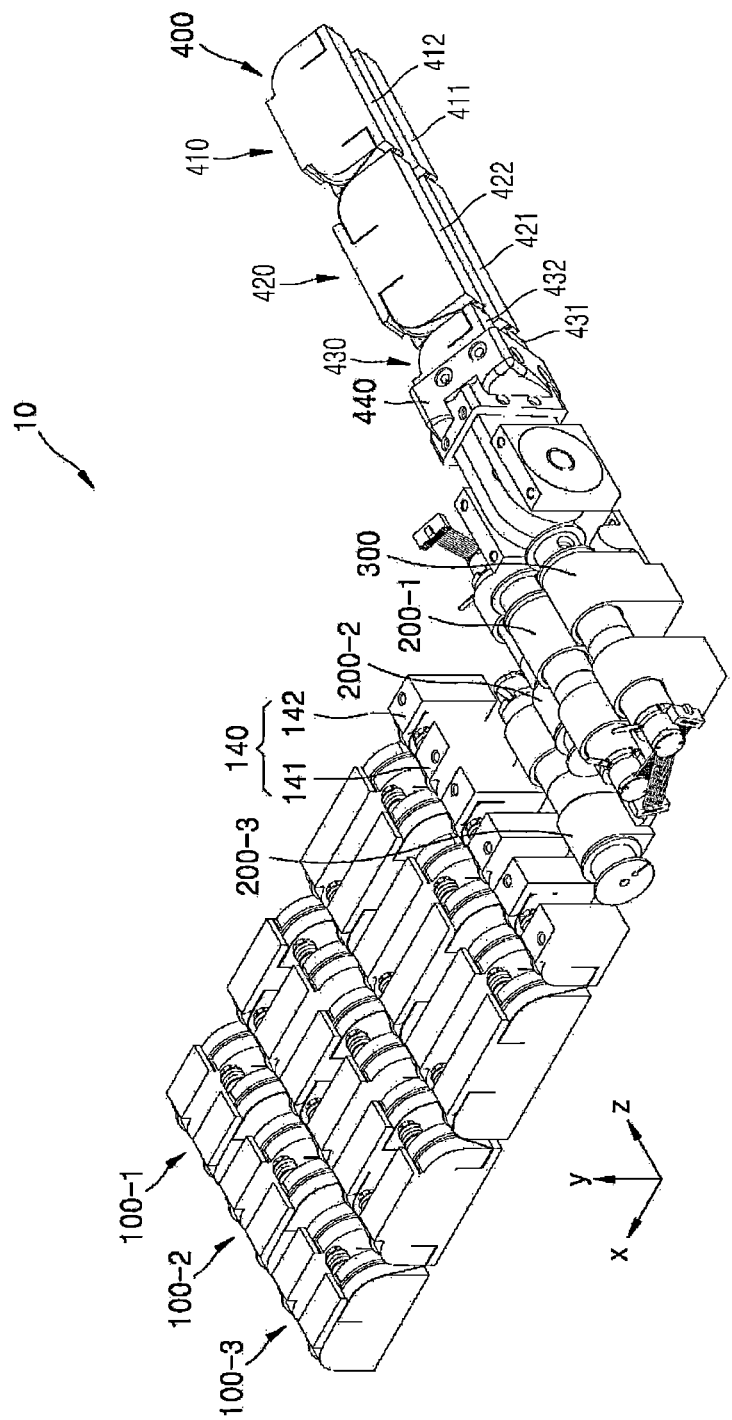
FIG. 7 is a perspective view illustrating a robot hand according to some embodiments of the present disclosure.
Figure 8:
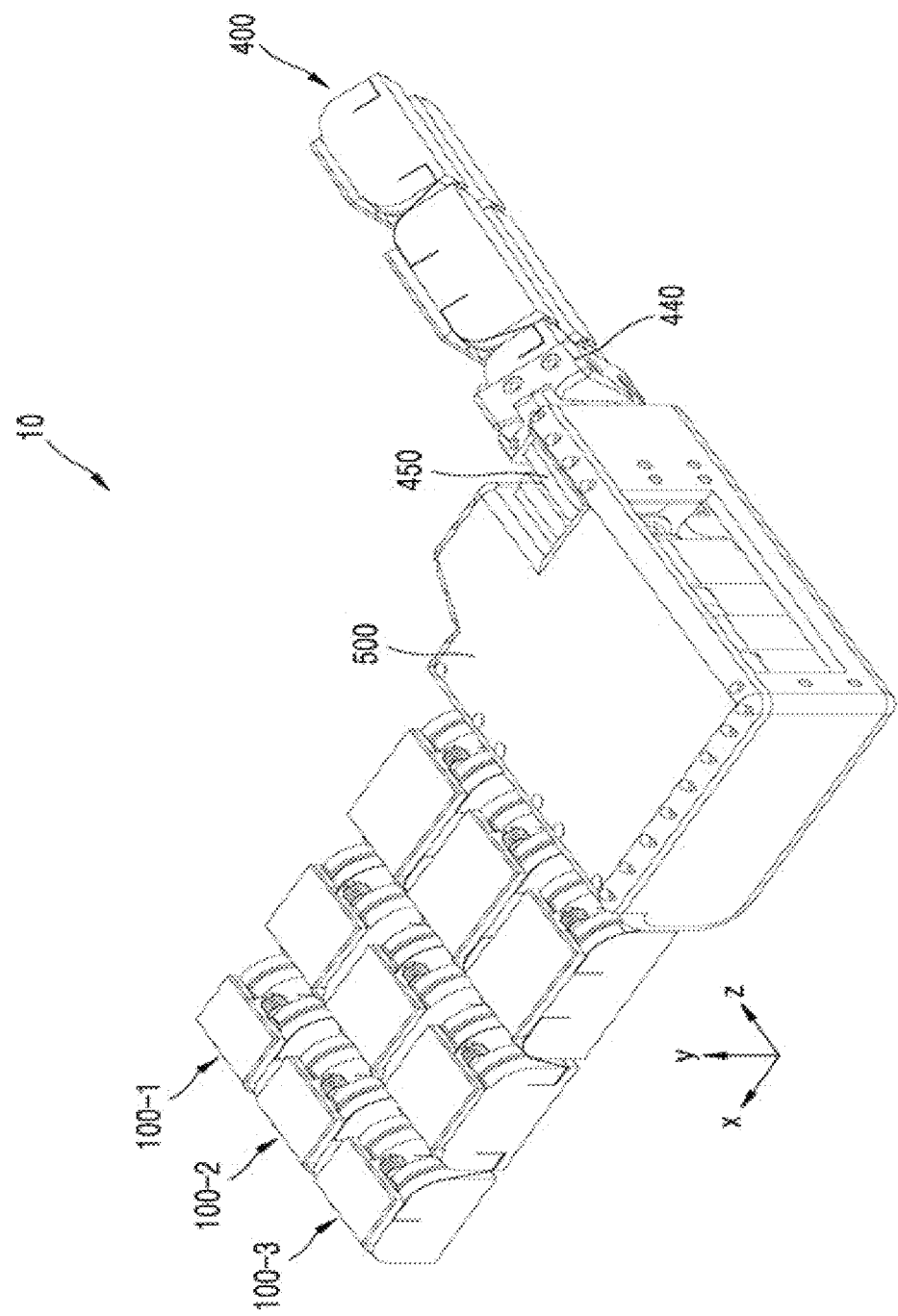
FIG. 8 is a perspective view illustrating an internal structure of the robot hand illustrated in FIG. 7.
Figure 9:
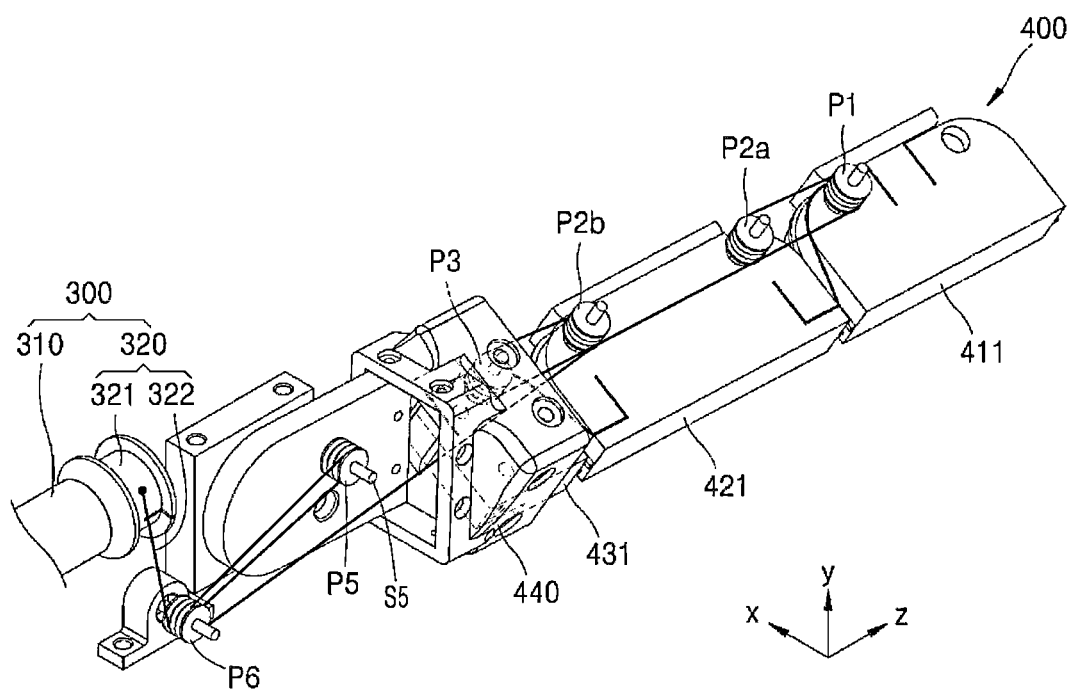
FIG. 9 is a perspective view illustrating a second robot finger of the robot hand illustrated in FIG. 7.

FIG. 7 is a perspective view illustrating a robot hand according to some embodiments of the present disclosure. FIG. 8 is a perspective view illustrating an internal structure of the robot hand illustrated in FIG. 7. FIG. 9 is a perspective view illustrating a second robot finger of the robot hand illustrated in FIG. 7.

Referring to FIGS. 7 to 9, the robot hand 10 may include a base part 500, a first robot finger 100, a second robot finger 400, a first driver 200, and a second driver 300.

The base part 500 may have a space formed therein to accommodate the first driver 200 and the second driver 300. The base part 500 may have various shapes such as a hemisphere or a polyhedron shape. However, for convenience of description, hereinafter, an embodiment in which the base part 500 is a rectangular parallelepiped will be mainly described.

The first robot finger 100 may be rotatably connected to the base part 500. In such a case, since specific features of the first robot finger 100 are the same as or similar to those described with respect to the robot joint structure 100 as described above, a detailed description thereof will be omitted.

In some embodiments, the first robot finger 100 may be provided in plural number. In such a case, the first robot finger 100 may include an index finger 100-1, a middle finger 100-2, and a ring finger 100-3, all of which have the same structure.

The second robot finger 400 may include a first body 410, a second body 420, a first joint J1, and a second joint J2. In addition, the second robot finger 400 may further include a connection body 430. In such a case, the first body 410 may include a pair of first frames 411 and 412, the second body 420 may include a pair of second frames 421 and 422, and the connection body 430 may include a pair of third frames 431 and 432. Since specific features of each of the components included in the second robot finger 400 are the same as or similar to those described with respect to the robot joint structure 100 as described above, an overlapping description thereof will be omitted.

The second robot finger 400 may be rotatably connected to the base part 500. The second robot finger 400 may be disposed in a direction crossing a longitudinal direction (X direction in FIG. 8) of the first robot finger 100. As an example, a longitudinal direction (Z direction in FIG. 8) of the second robot finger 400 may be perpendicular to the longitudinal direction of the first robot finger 100.

A first rotation member 440 and a second rotation member 450 may be disposed between the second robot finger 400 and the base part 500.

In one embodiment of the present disclosure, the second robot finger 400 may be connected to the first rotation member 440 so as to be rotatable about a longitudinal central axis of the second robot finger 400. In such a case, since the second robot finger 400 is disposed in a state that is rotated about the longitudinal central axis of the second robot finger 400 by a predetermined angle, the gripping surface of the second robot finger 400 may face the gripping surface of the first robot finger 100. In another embodiment of the present disclosure, the second robot finger 400 may be connected to the first rotation member 440 so as to be rotatable about an orthogonal axis to the longitudinal central axis of the second robot finger 400 (first rotation motion).

In one embodiment of the present disclosure, the first rotation member 440 may be rotatably connected to the second rotation member 450. In such a case, the first rotation member 440 may rotate about a longitudinal central axis of a fifth shaft S5 through which the first rotation member 440 is connected to the second rotation member 450. In another embodiment of the present disclosure, the first rotation member 440 and the second rotation member 450 may be rotatably connected to the base part 500. In such a case, the first rotation member 440 and the second rotation member 450 may rotate about a longitudinal central axis of a fifth shaft S5 (second rotation motion).

Since the second robot finger 400 allows a dual rotation motion including the first rotation motion and the second rotation motion as described above, an arrangement of the second robot finger 400 may be changed according to the shape of a target object to be gripped by the robot hand 10, thereby expanding range of use of the robot hand 10 and improving stability of the gripping.

The first driver 200 may drive the first robot finger 100. In such a case, the first driver 200 may be disposed inside the base part 500.

In some embodiments, when the first robot finger 100 is provided in plural number, the first driver 200 may also be provided in plural number to correspond to the number of first robot fingers 100. In such a case, each of an index driver 200-1, a middle driver 200-2, and a ring driver 200-3 of the plurality of first drivers 200 may be connected to the index finger 100-1, the middle finger 100-2, and the ring finger 100-3 of the plurality of first robot fingers 100, respectively. In such a case, since the index driver 200-1 transfers the driving force to the index finger 100-1, the middle driver 200-2 transfers the driving force to the middle finger 100-2, and the ring driver 200-3 transfers the driving force to the ring finger 100-3, each of the fingers 100-1, 100-2, and 100-3 may be independently driven. Accordingly, even when the surface of the target object is not smooth and protrusions with different protrusion degrees are partially formed on the target surface, since each of the plurality of first robot fingers 100 is bent differently to correspond to a surface state of the target object, the range of use of the robot hand 10 may be expanded and the stability of the gripping may be improved.

Since the connection relationship and driving force transferring method between the first driver 200 and the first robot finger 100 is the same as or similar to those described with respect to the robot joint structure 100 as described above, an overlapping description thereof will be omitted.

The second driver 300 may be connected to the second robot finger 400 so as to drive the second robot finger 400. In some embodiments, the second driver 300 may be disposed inside the base part 500. The second driver 300 may be disposed to be spaced apart from the second robot finger 400.

The second driver 300 may include a driving force generating part 310 and a driving force transferring part 320. The driving force generating part 310 may generate a driving force that rotates the first body 410 and the second body 420 of the second robot finger 400. The driving force generating part 310 may be, for example, a motor (a second motor) 310.

The driving force transferring part 320 may connect the driving force generating part 310 and the second robot finger 400, and transfer the driving force generated by the driving force generating part 310 to the second robot finger 400. In such a case, the driving force transferring part 320 may include a second motor pulley 321 and a second wire 322.

In some embodiments, the second motor 310 and the pulleys may be connected by a single wire 322 extending from the second motor pulley 321. In such a case, the second wire 322 may extend from the second motor pulley 321 through the spaces between the pairs of first to third frames (411 and 412; 421 and 422; and 431 and 432). The second wire 322 may be fixedly connected to the second motor pulley 321 and may extend toward the first pulley P1 from the connected point on the second motor pulley 321. In such a case, the second wire 322 may be wound around at least one of the pulleys P1, P2a, P2b, P3, P5, P6 that are disposed between the first pulley P1 and the second motor pulley 321, or may be wound simultaneously around the two pulleys. The second wire 322 extends to the first pulley P1 and then extends toward the second pulley P2a again. Then, after extending to the second pulley P2a, the second wire 322 may be fixed to the second pulley P2a. Since the connection relationship and driving force transferring method between the second driver 300 and the second robot finger 400 is the same as or similar to those described with respect to the robot joint structure 100 as described above, an overlapping description thereof will be omitted.

Figure 10:
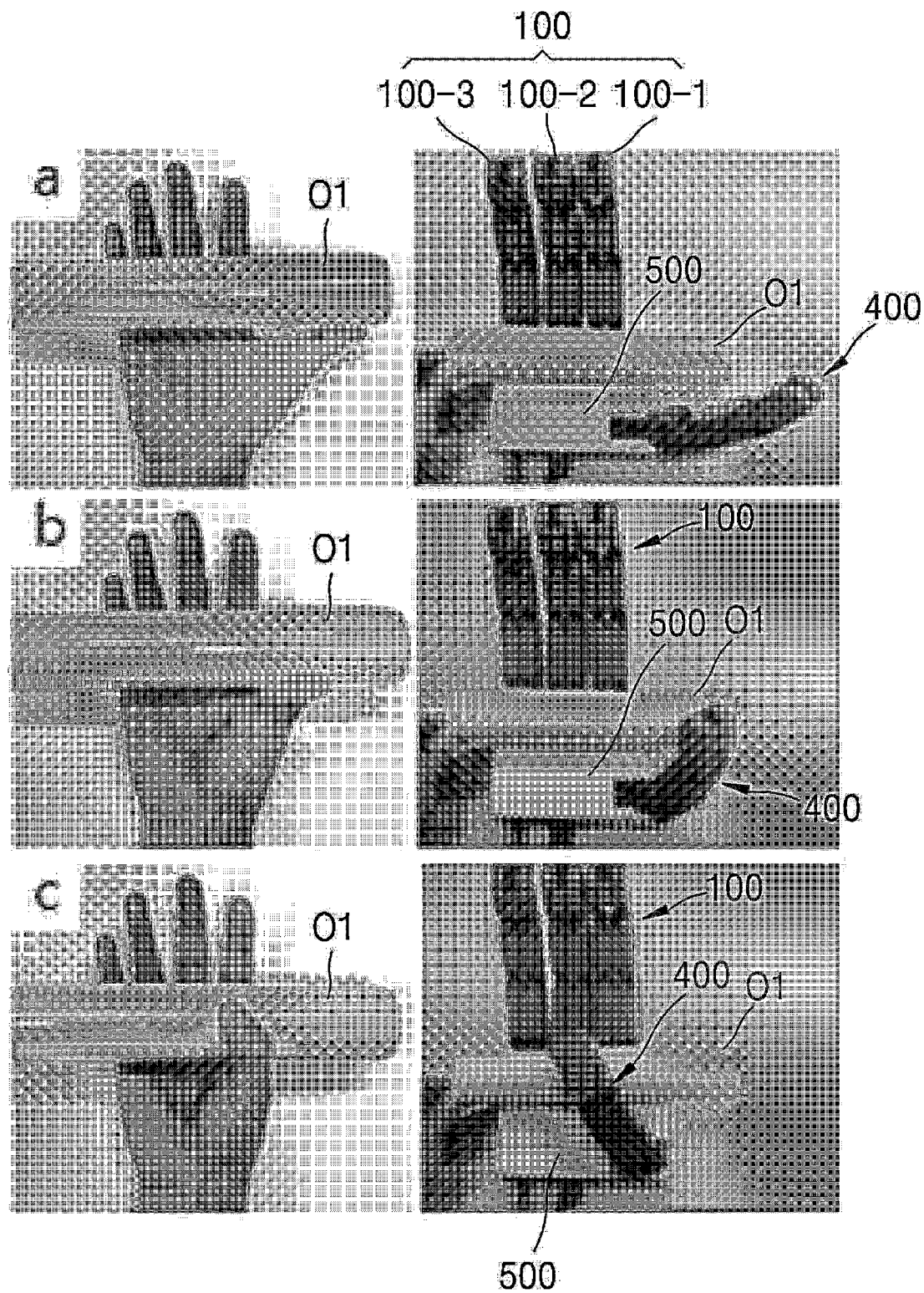
FIG. 10 is a view comparing gripping operations of the robot hand illustrated in FIG. 7 and gripping operations of a human hand.
Figure 11:
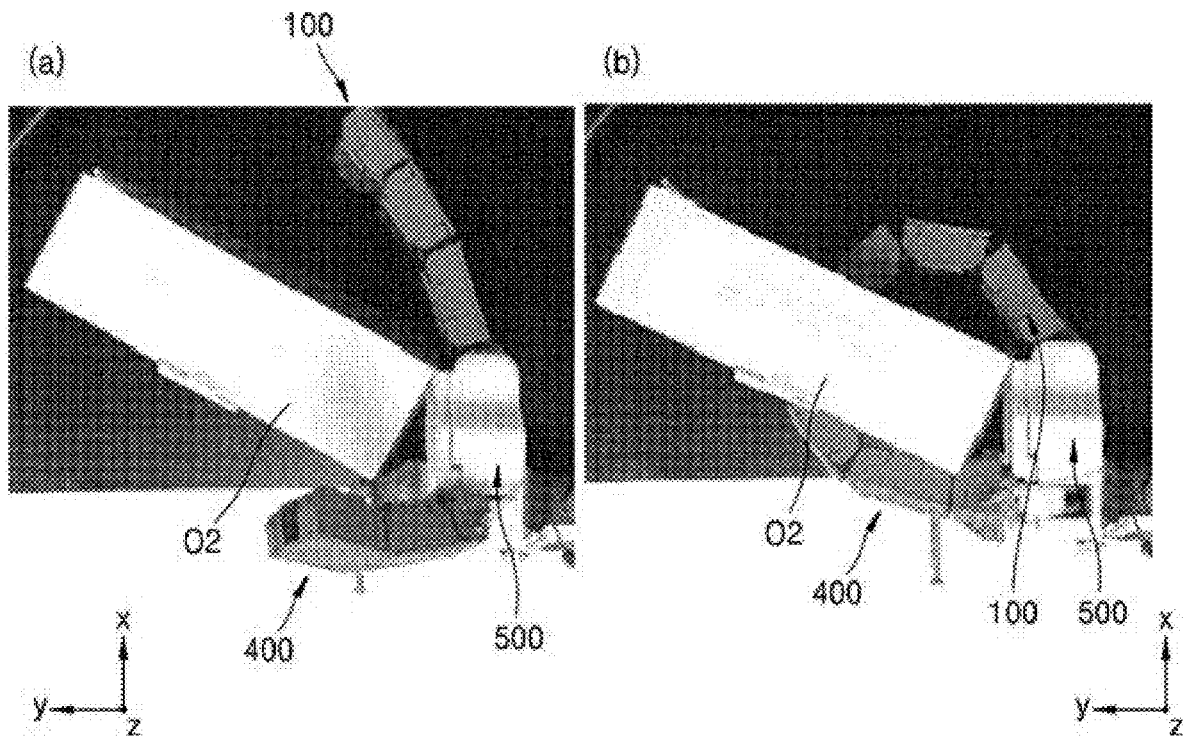
FIG. 11 is a view illustrating gripping operations of the robot hand illustrated in FIG. 7.

FIG. 10 is a view comparing the gripping operation of the robot hand illustrated in FIG. 7 and the gripping operation of the human hand. FIG. 11 is a view illustrating the gripping operation of the robot hand illustrated in FIG. 7.

Referring to FIG. 10, processes in which the second robot finger 400 of the robot hand 10 and the thumb of the human hand grip the same first target object 01 may be compared. The second robot finger 400 may grip the target object 01 by operating similarly to the thumb of the human hand through the dual rotation motion as described above.

Referring to FIG. 11, a process in which the robot hand 10 grips a second target object 02 having an angled corner is illustrated. As described above, when at least a portion of the first body 110 of each of the first robot finger 100 and the second robot finger 400 comes into contact with the second target object 02, the operation of the motors 210 and 310 is stopped, so the robot hand 10 may maintain a state in which it is gripping the second target object 02.

Figure 12A:
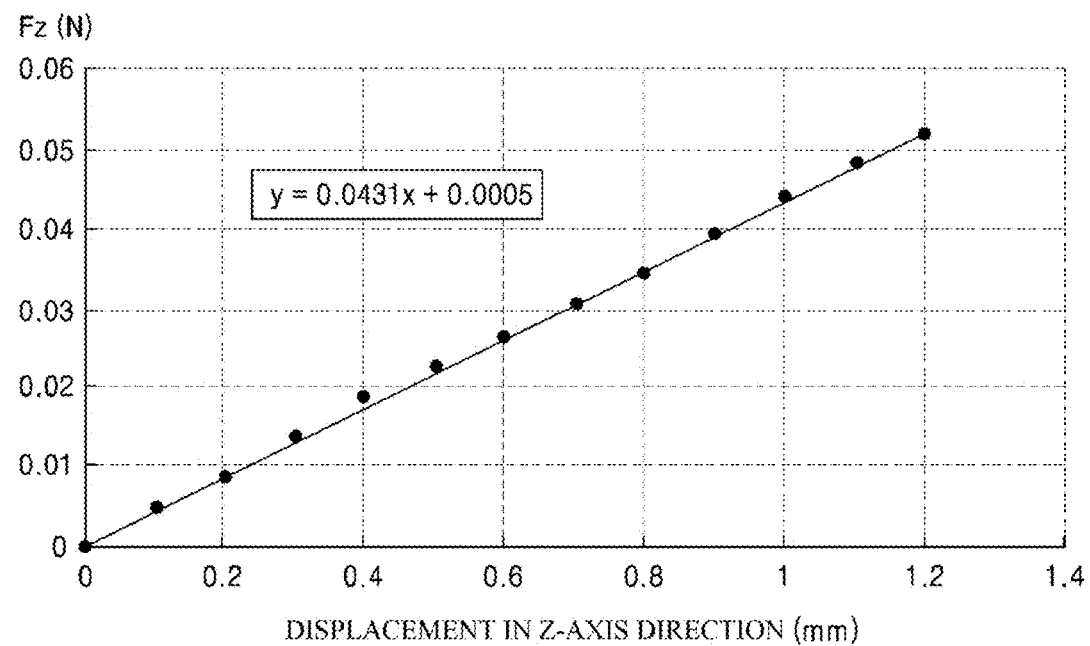
FIGS. 12A and 12B are graphs illustrating rotational stiffness of a robot joint structure according to a joint.
Figure 12B:
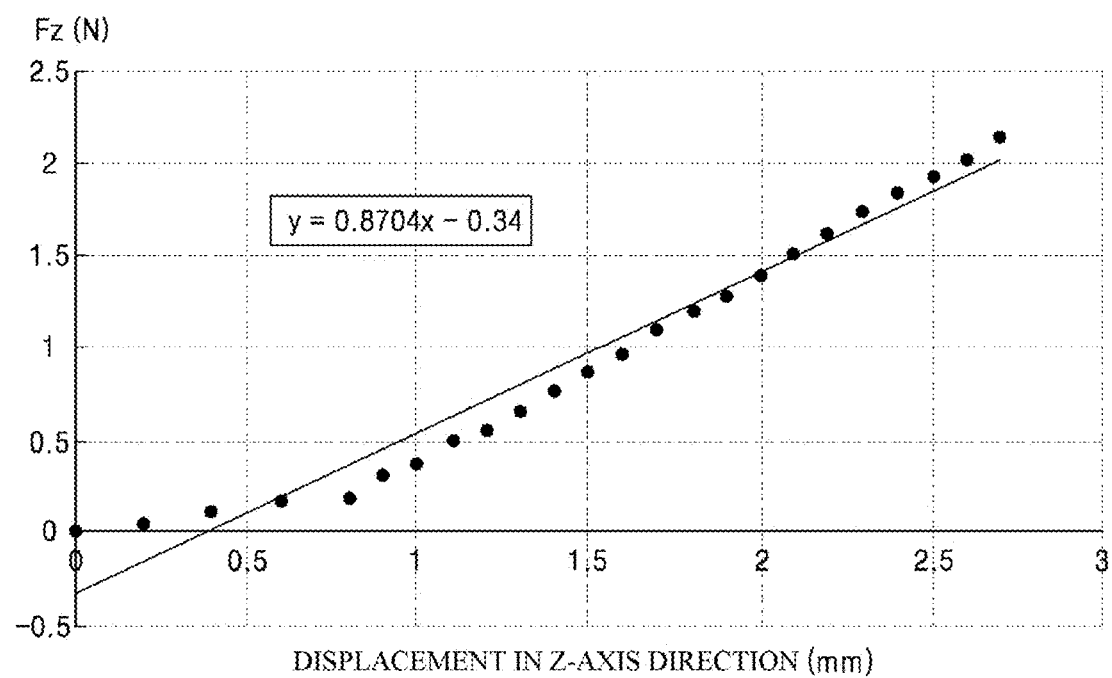

FIGS. 12A and 12B are graphs illustrating rotational stiffness of a robot joint structure according to a type of joint.

Specifically, when the robot joint structure 100 lifts the object from the ground (Z=0 in FIGS. 12A and 12B), a force is applied to the robot joint structure 100 in a direction toward the ground (Z direction in FIG. 11) due to the load of the object and of the robot joint structure 100. As a result, a bending moment may be applied to the joints J1 and J2 in the direction toward the ground. In addition, as a height of the lifted object from the ground increases, a force FZ applied to the robot joint structure 100 increases, which in turn may increase a bending moment applied to the joint. That is, the height of the lifted object, the force FZ applied to the robot joint structure 100, and the bending moment applied to the joints J1 and J2 may be proportional to one another.

FIG. 12A illustrates rotational stiffness of a robot joint structure having one joint, rather than having two joints J1 and J2 that are arranged in mirror image symmetry to each other, and FIG. 12B illustrates rotational stiffness of the robot joint structure 100 having the two joints J1 and J2 that are arranged in mirror image symmetry to each other. When comparing the graphs of FIG. 12A and of FIG. 12B, in both graphs, it may be seen that as the height of the lifted object (that is, displacement in a Z-axis direction) increases, the force FZ applied to the robot joint structure 100 increases in proportion to the increase in the height, where the slope of a straight line in the two graphs represents the rotational stiffness of the joint in the Z-axis direction. In such a case, the rotational stiffness (for example, 0.8704 in FIG. 12B) of the robot joint structure 100 having the joints J1 and J2 that are arranged in mirror image symmetry may be about 20 times greater than the rotational stiffness (for example, 0.0431 in FIG. 12A) of the robot joint structure having the joint that does not have a mirror image symmetry structure. That is, the robot joint structure 100 having the two joints J1 and J2 that are arranged in mirror image symmetry may have much higher rotational stiffness than the robot joint structure having the joint that does not have a mirror image symmetry structure, thereby supporting a relatively larger load of the object. In addition, by preventing the joints J1 and J2 from being bent or damaged in the load direction of the object, the durability of the robot joint structure 100 may be improved.

As described above, in the robot joint structure 100 and the robot hand 10 including the same, according to the embodiments of the present disclosure, since two adjacent bodies are connected by the two joints J1 and J2 that are arranged in mirror image symmetry to each other, the rotational stiffness and the durability of the robot joint structure 100 may be improved. In addition, in the robot joint structure 100 and the robot hand 10 including the same, according to the embodiments of the present disclosure, since the drive mechanism is disposed between the pair of frames of the body, the space arrangement is efficient, thereby enabling a compact design of the robot hand 10.

The foregoing has been described with reference to the embodiments illustrated in the drawings, but these are merely exemplary, and those of skill in the art will appreciate that various modifications and another equivalent embodiments are possible therefrom. Therefore, the true technical protection scope of the present disclosure should be determined by the technical spirit of the appended claims.

DESCRIPTION OF SYMBOLS

10: Robot hand
100: Robot joint structure, First robot finger
110: First body
120: Second body
130: Third body
140: Connection body
J1: First joint
J2: Second joint
200: Driver, First driver
300: Second driver
400: Second robot finger
500: Base part

What is claimed is:
1. A robot joint structure comprising:
a first body;
a second body disposed to be spaced apart from the first body;
a first joint configured to connect the first body and the second body; and
a second joint disposed to face the first joint and configured to connect the first body and the second body,
wherein the first joint comprises a first connector and a second connector that cross each other,
wherein the second joint comprises a third connector and a fourth connector that cross each other,
wherein the first joint and the second joint are arranged in mirror image symmetry to each other,
wherein the first body comprises a pair of first frames arranged to be spaced apart from each other, and
wherein the second body comprises a pair of second frames arranged to be spaced apart from each other.

2. The robot joint structure of claim 1, wherein the first joint is configured to connect one of the pair of first frames and one of the pair of second frames, which face each other, and
wherein the second joint is configured to connect the other one of the pair of first frames and the other one of the pair of second frames, which face each other.

3. The robot joint structure of claim 1, wherein the first frame comprises a first protrusion protruding between the first connector and the second connector or protruding between the third connector and the fourth connector, each of the first to fourth connectors being connected to the first frame, and
wherein the second frame comprises a second protrusion protruding between the first connector and the second connector or protruding between the third connector and the fourth connector, each of the first to fourth connectors being connected to the second frame.

4. The robot joint structure of claim 1, wherein each of the first to fourth connectors comprises a curved portion between one end thereof connected to the first body and the other end thereof connected to the second body.

5. The robot joint structure of claim 1, further comprising a driver configured to drive at least one of the first body or the second body.

6. The robot joint structure of claim 5, wherein the driver comprises:
a driving force generating part configured to generate a driving force; and
a driving force transferring part configured to transfer, to the first body and the second body, the driving force generated by the driving force generating part.

7. The robot joint structure of claim 6, wherein the first body comprises at least one first pulley,
wherein the second body comprises at least one second pulley,
wherein the driving force generating part comprises a motor, and
wherein the driving force transferring part comprises:
a motor pulley connected to the motor; and
a wire connected to the motor pulley, the first pulley, and the second pulley, and configured to transfer the driving force to the first body and the second body.

8. The robot joint structure of claim 7, wherein the wire extends from the motor pulley through a space between the pair of first frames, and through a space between the pair of second frames.

9. A robot hand comprising:
a base part;
a plurality of first robot fingers rotatably connected to the base part;

a second robot finger disposed in a direction crossing a longitudinal direction of the plurality of first robot fingers;

a first driver disposed in the base part and configured to drive the plurality of first robot fingers; and a second driver disposed in the base part and configured to drive the second robot finger, wherein each of the plurality of first robot fingers and the second robot finger comprises:

a first body;

a second body disposed to be spaced apart from the first body;

a first joint configured to connect the first body and the second body; and a second joint disposed to face the first joint and configured to connect the first body and the second body, wherein the first joint comprises a first connector and a second connector that cross each other, and wherein the second joint comprises a third connector and a fourth connector that cross each other.

10. The robot hand of claim 9, wherein the first joint and the second joint are arranged in mirror image symmetry to each other.

11. The robot hand of claim 10, wherein the first body comprises a pair of first frames arranged to be spaced apart from each other, and wherein the second body comprises a pair of second frames arranged to be spaced apart from each other.

12. The robot hand of claim 11, wherein the first joint is configured to connect one of the pair of first frames and one of the pair of second frames, which face each other, and wherein the second joint is configured to connect the other one of the pair of first frames and the other one of the pair of second frames, which face each other.

13. The robot hand of claim 12, wherein the first frame comprises a first protrusion protruding between the first connector and the second connector or protruding between the third connector and the fourth connector, each of the first to fourth connectors being connected to the first frame, and wherein the second frame comprises a second protrusion protruding between the first connector and the second connector or protruding between the third connector and the fourth connector, each of the first to fourth connectors being connected to the second frame.

14. The robot hand of claim 9, wherein each of the first to fourth connectors comprises a curved portion between one end thereof connected to the first body and the other end thereof connected to the second body.

15. The robot hand of claim 11, wherein the first body comprises at least one first pulley, wherein the second body comprises at least one second pulley, and wherein the first driver comprises:

a first motor configured to generate a driving force;

a first motor pulley connected to the first motor; and a first wire connected to the first motor pulley, the first pulley, and the second pulley, and configured to transfer the driving force to the plurality of first robot fingers.

16. The robot hand of claim 15, wherein the first wire extends from the first motor pulley through a space between the pair of first frames of the first robot finger, and through a space between the pair of second frames of the first robot finger.

17. The robot hand of claim 11, wherein the first body comprises at least one first pulley, wherein the second body comprises at least one second pulley, and wherein the second driver comprises:

a second motor configured to generate a driving force;

a second motor pulley connected to the second motor; and a second wire connected to the second motor pulley, the first pulley, and the second pulley, and configured to transfer the driving force to the second robot finger.

18. The robot hand of claim 17, wherein the second wire extends from the second motor pulley through a space between the pair of first frames of the second robot finger, and through a space between the pair of second frames of the second robot finger.

* * * * *